April 30, 1940.  M. KLAVÍK  2,199,317
VENTILATION OF THE MOTOR COMPARTMENT OF AUTOMOBILES
Filed Feb. 28, 1939
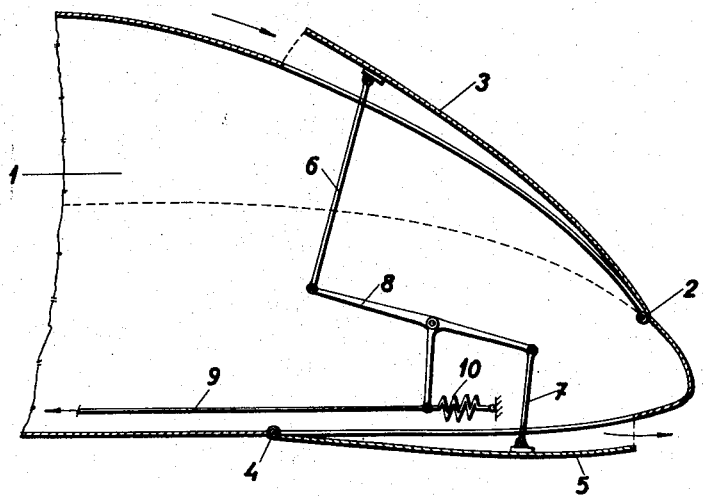
Inventor
Milos Klavík
By Bilinger Atty.

Patented Apr. 30, 1940

2,199,317

UNITED STATES PATENT OFFICE 2,199,317

VENTILATION OF THE MOTOR COMPARTMENT OF AUTOMOBILES

Miloš Klavík, Prague-Smichov, Czechoslovakia

Application February 28, 1939, Serial No. 259,049
In Czechoslovakia January 18, 1938

2 Claims. (Cl. 180—54)

The ventilation of the motor compartment of air-cooled streamlined automobile bodies having rear engines, presents particular difficulties both with regard to the supply of cooling air and also with regard to the circulation of the already heated air.

According to the invention, a perfectly controllable ventilation of the motor compartment is effected by the fact that the lower and upper walls of the motor compartment are formed as covers mounted for pivotal movement out of the contour of the body and are hinged to the side walls thereof in such a manner that the upper wall opens forwardly opposite to the direction of travel while the lower wall opens rearwardly, said opening being effected by means of a triple-armed lever actuated either directly by the vehicle driver or automatically in accordance with the heating of the engine.

The accompanying drawing which shows a longitudinal section through the rearward part of a streamlined automobile body, represents a constructional example of the invention.

Pivoted to the side walls 1 of the body on hinges 2 are an upper cover 3 of the motor compartment and on hinges 4 a lower cover 5. The covers 3 and 5 which are adapted to be opened are connected by pull rods 6 and 7 to a triple-armed lever 8, which is operated by a pull rod 9 leading to the automobile driver or by an automatic device reacting to the rise in temperature in the motor compartment. The closing of both the upper and lower cover is effected by a spring 10 or similar means.

I claim:

1. In a streamlined automobile body, an air-cooled motor compartment comprising a hinged upper cover, a hinged lower cover and means for opening and closing the covers simultaneously.

2. In a streamlined automobile body, an air-cooled motor compartment comprising upper and lower covers hinged to the sides of the body, a triple-armed lever pivoted within the body, connections attaching the covers to two arms of the triple-armed lever and a pull rod for operating the triple-armed lever attached to the other arm of same.

MILOŠ KLAVÍK.